United States Patent [19]

Pfordresher

[11] Patent Number: 5,432,306

[45] Date of Patent: Jul. 11, 1995

[54] APPLIANCE MUFFLER

[76] Inventor: Michael Pfordresher, 11000 S. Ocean Dr., Apt. 5D, Jenson Beach, Fla. 34957

[21] Appl. No.: 83,653

[22] Filed: Jun. 25, 1993

[51] Int. Cl.⁶ .......................... A47B 81/06; H02K 5/24
[52] U.S. Cl. .................................. 181/198; 181/202; 181/208
[58] Field of Search ............... 181/198, 200, 202, 203, 181/204, 205, 208, 211, 230

[56] References Cited

U.S. PATENT DOCUMENTS

| | | | |
|---|---|---|---|
| 1,749,177 | 3/1930 | Baxter et al. | 181/200 |
| 2,223,196 | 11/1940 | Watkins | 181/200 |
| 3,160,227 | 12/1964 | Hautala | 181/200 |
| 4,258,821 | 3/1981 | Wendt et al. | 181/202 |
| 4,883,144 | 11/1989 | Haushalter et al. | 181/198 |
| 4,889,209 | 12/1989 | Sears | 181/200 |
| 4,892,413 | 1/1990 | Vats | 336/349 |

Primary Examiner—M. L. Gellner
Assistant Examiner—Eddie C. Lee
Attorney, Agent, or Firm—Malin, Haley, DiMaggio & Crosby

[57] ABSTRACT

An appliance muffler for absorbing sound wave vibrations and impact from foreign objects employed to muffle noise transmissions produced by the appliance and to protect the outer surface of the appliance, wherein the appliance muffler comprises a flexible appliance jacket mounted over the appliance base and a flexible and stretchable appliance container sleeve mounted over the container.

8 Claims, 5 Drawing Sheets

1

APPLIANCE MUFFLER

BACKGROUND OF THE INVENTION

1. Field of the Invention

This invention relates generally to a sound muffling device for small kitchen appliances, such as blenders, and in particular, to a sound absorbing device used to muffle noise transmitted from electrically operated appliances.

2. Description of the Prior Art

Small, motor operated devices, such as blenders, emit noises during operation that are annoying and physically damaging to the eardrums of operators and bystanders alike. Most of these appliances are powered by high-rpm motors that transmit acoustic waves that propagate at frequencies which are sensitive to the human eardrum. Repeated exposure to such sound wave alterations has been known to cause damage to the ear drum. In restaurants or taverns, these sounds make it difficult for employees and patrons to communicate, while at home, a loud kitchen appliance can be bothersome to guests and embarrassing to the host. A different problem confronts appliances found in congested areas, wherein these kitchen tools are susceptible to damage, resulting in replacement or repair cost borne by the consumer. Therefore, a device capable of muffling sound vibrations produced by common appliances to mitigate noise pollution having the added benefit of providing protection from impact to the appliance would be welcomed.

Several devices known in the prior art attempt to reduce noise transmission from electrical appliances, however, these designs have structures that appear to be inefficient and oversized for cluttered areas such as commercial kitchens and bars. The sound and vibration reducing apparatus, disclosed in U.S. Pat. No. 4,892,413, issued to Vats, provides a rigid insulated housing that employs intricate hardware and a plurality of levers that operate the appliance controls. The Vats apparatus requires the assembly of parts, contains noise emitting seams between the walls of the housing and is too awkward for convenient use. U.S. Pat. No. 4,889,209, issued to Sears, incorporates a sound insulating container for completely enclosing electrical appliances having rigid walls, a hinged door and an interior electrical outlet. This apparatus is found to be complicated in design and requires ample space for storage. A sound retention cabinet is found in U.S. Pat. No. 2,223,196, issued to Watkins, for suppressing noises generated by calculating machines. Another silencing cover is found in U.S. Pat. No. 1,749,177, issued to Baxter, which is adapted for floor attachment and covering machines. Finally, U.S. Pat. No. 3,160,227, issued to Hautala, employs a sound proof box for enclosing cameras.

While the aforementioned devices disclose various designs for silencing noise emissions propagated by machines, no such device teaches the benefit of a low profile design capable of sufficiently reducing noise pollution from small kitchen appliances while protecting the same. Therefore, there exists a need for a muffling device capable of absorbing sounds, vibrations and impact produced from and received by electrical appliances. The present invention is intended to address and solve these problems not adequately resolved by the prior art by providing a flexible muffler jacket for use with kitchen appliances that is simple, novel and efficient in design.

SUMMARY OF THE INVENTION

The present invention contemplates an appliance muffler which absorbs sound vibrations and provides a durable protection cover. This appliance muffler is flexible such that it maintains the shape of the electrical appliance to conserve space and to make it simple for installation, and serves the dual purpose of muffling sound vibrations produced by the appliance and protecting the same from impact that can normally occur in a kitchen or service area. The appliance muffler is preferably comprised of a base jacket and a container sleeve for insulating and protecting the appliance motor and container, respectively.

In the preferred embodiment, the base jacket is constructed from a flexible sound and shock insulating synthetic, such as neoprene, polystyrene foam, synthetic rubber or other foam-like material, having a continuous curved sidewall, an open bottom end and a top end closure panel. The jacket may be cylindrical in shape or otherwise, but in any event, it is designed to conform to the shape of the appliance. The base jacket includes an open bottom end for receiving the appliance base and a top section that is integrally formed with or securely and sealingly attached to the peripheral edge of the top end of the jacket. The top section defines a centrally located aperture for receiving the container that normally mounts to the appliance base, such as a blender or food processor. In the preferred embodiment a groove may be found in the bottom surface of the top section around the circumferential edge of the top section aperture. This groove provides a recession in the top section for receiving container support brackets typically found protruding from the top end of an appliance base to better effectuate the concealment of the motor. An aperture is provided in the sidewall of the jacket to accommodate and afford access to appliance switches or controls. This control aperture may be designed to fit snugly around and flush against the switch to maintain proper insulation of the appliance. The base jacket sidewall can also employ a heat vent comprised of a plurality of slits sized to release heat without substantially impairing the sound absorption function of the jacket.

In the preferred embodiment, the container sleeve comprises a flexible sound, thermal and shock absorbing material such as neoprene, polystyrene or other synthetic rubber or foam-like material for insulating and protecting the mixing container. The container sleeve serves to protect the container from impact, to absorb sounds emitted from the container, to absorb container vibrations caused by the motor and to maintain thermal properties of the container. The container sleeve is stretchable such that it snugly conforms to the shape of the container, and may be cylindrical in shape or otherwise and still fall within the scope of the invention.

To utilize the instant invention the open bottom end of the base jacket is placed over the appliance base insert to insulate and enclose the same. The jacket should be placed over the blender base completely, so that the appliance brackets that support the container engage the groove or recession defined by the top section receiving aperture. The container sleeve is stretched and pulled over the appliance container to insulate and protect the same. The container is subsequently inserted through the receiving aperture of the jacket and mounted to the appliance base enclosed by the jacket. The muffler jacket and sleeve fit snugly to the contours of the appliance base and container affording impact protection to the outer surface while absorbing and muffling acoustical waves and vibrations transmitted by the appliance during operation. The appliance muffler is also water safe and space efficient, as is inherent in the design.

In an alternative embodiment, the base jacket and container sleeve remain as aforementioned while the invention incorporates a rigid base plate that may be fabricated from wood, plastic, plaster or other rigid material. The base plate is a rigid planar surface utilized to absorb vibration, to provide support and to effectuate the secured attachment of the base jacket. The base plate may also employ grooves or bores to vent heat by channelling the heat from the lower end of the appliance through the grooves and out into the ambient. In this alternative embodiment, the lower and interior surface of the base jacket and the outer peripheral edge of the base plate contain fabric fastening means, such as velcro and velcro patches, strategically aligned in positions that facilitate the secured attachment of the base jacket to the base plate.

DESCRIPTION OF THE PREFERRED EMBODIMENTS

Figure 1:
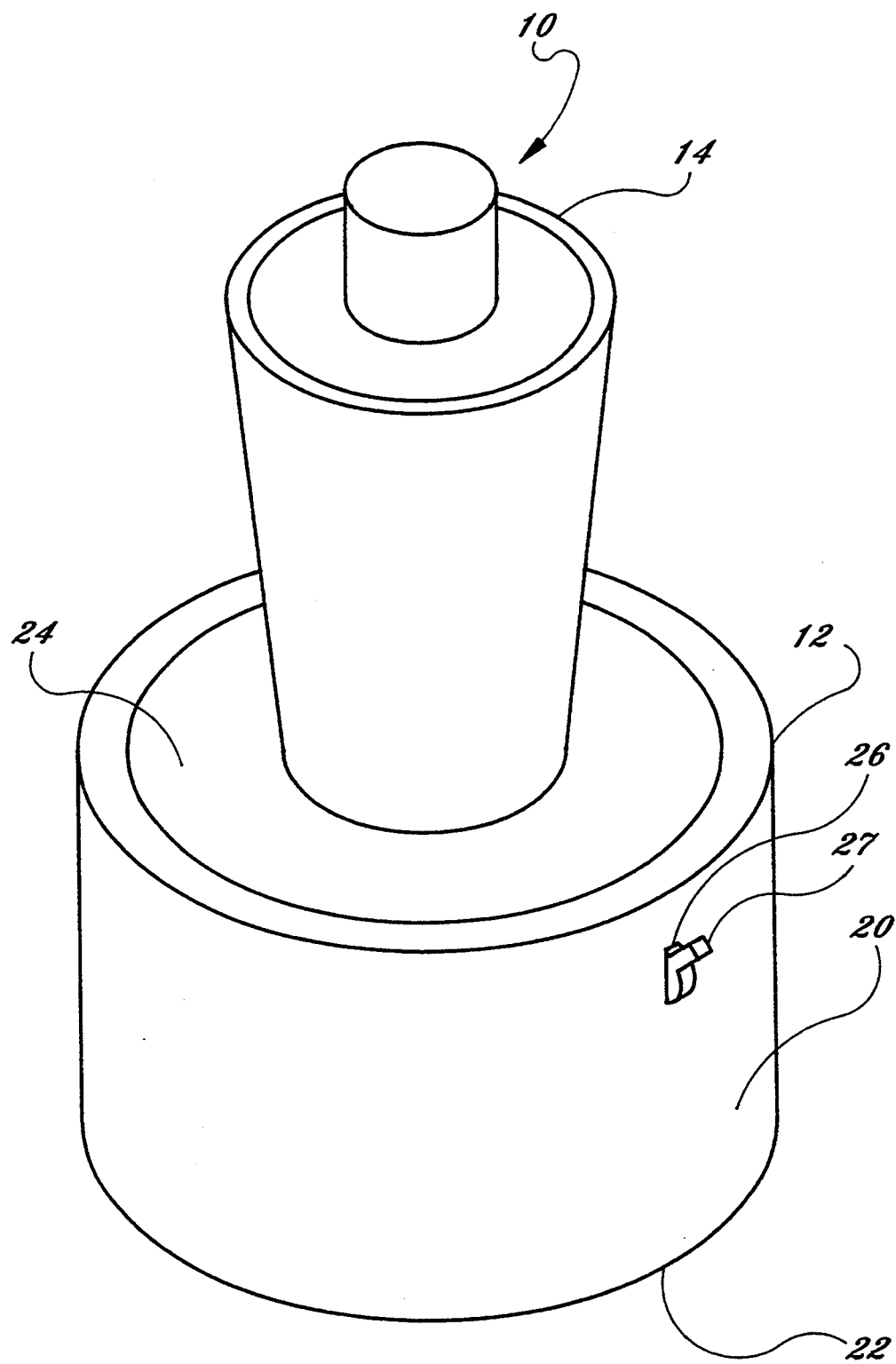
FIG. 1 is a perspective view of the instant invention.
Figure 2:
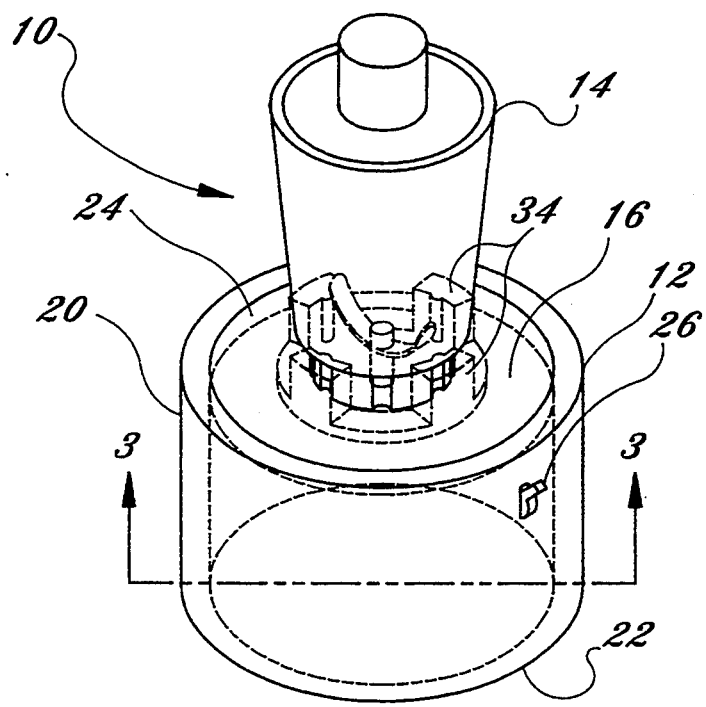
FIG. 2 is a perspective view of the instant invention with the appliance base shown in fantom.
Figure 3:
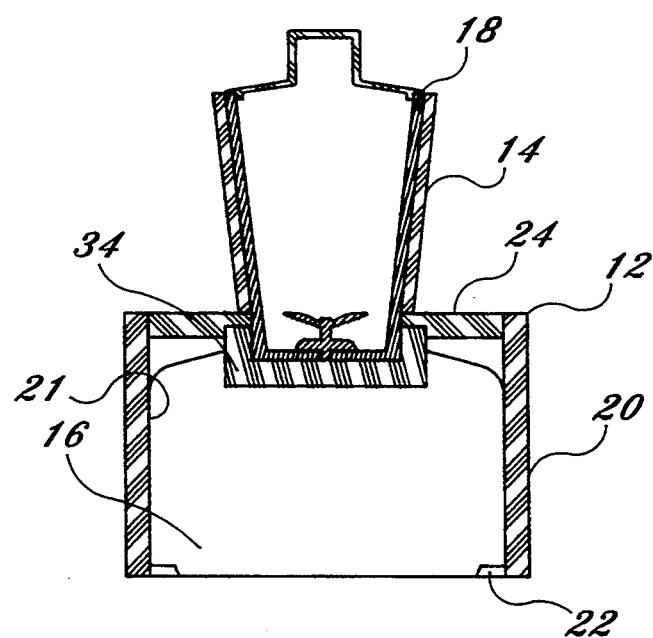
FIG. 3 is a cross section view of the instant invention taking along line 3—3 of FIG. 2.

With reference to FIGS. 1-8, there is depicted an appliance muffler, characterized by the reference numeral 10, comprising a base jacket 12 and a container sleeve 14. While the drawings show the appliance muffler 10 utilized with a blender, the appliance muffler may be adapted for use with other electrical appliances, such as food processors.

The appliance muffler 10 is a sound and impact absorbing apparatus utilized with electrical appliances, such as a blender, wherein the appliance muffler absorbs acoustical vibrations transmitted by the appliance and protects the same from impact caused by foreign objects. As seen in FIGS. 1-4 the base jacket 12 is slipped over the appliance base 16, while the container sleeve 14 is fitted over the appliance container 18. The jacket 12 and the sleeve 14 are fabricated from a flexible, sound vibration and shock absorbing synthetic, such as neoprene, polystyrene foam, synthetic rubber or other foam-like material, that conforms to the shape of the appliance and serves the dual purpose of muffling sound vibrations produced by the appliance and protecting the same from damage causing impact.

Figure 5:
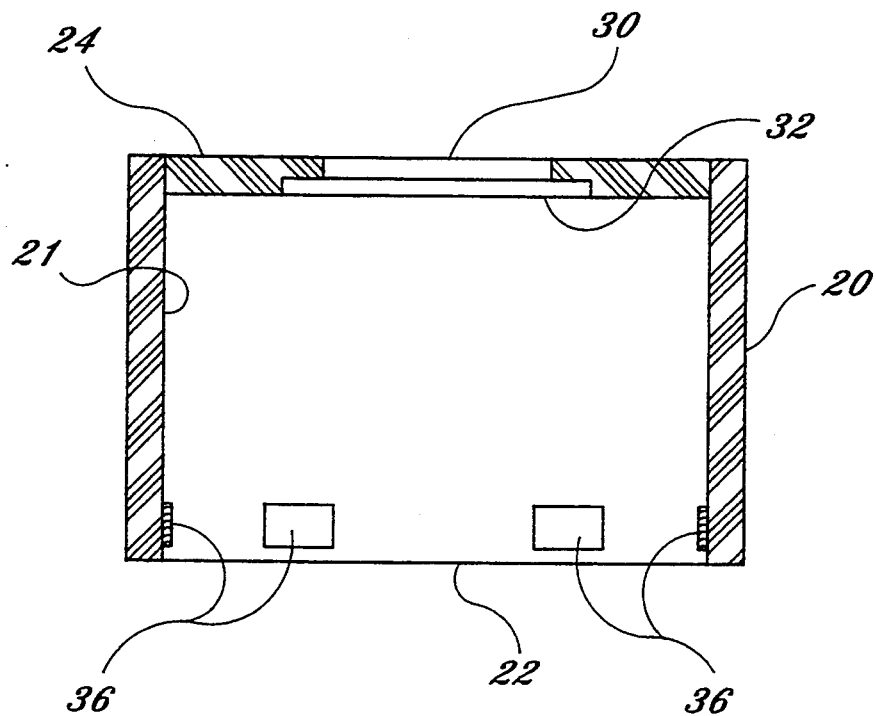
FIG. 5 is a cross section view of the base jacket taken along line 5—5 of FIG. 4.
Figure 6:
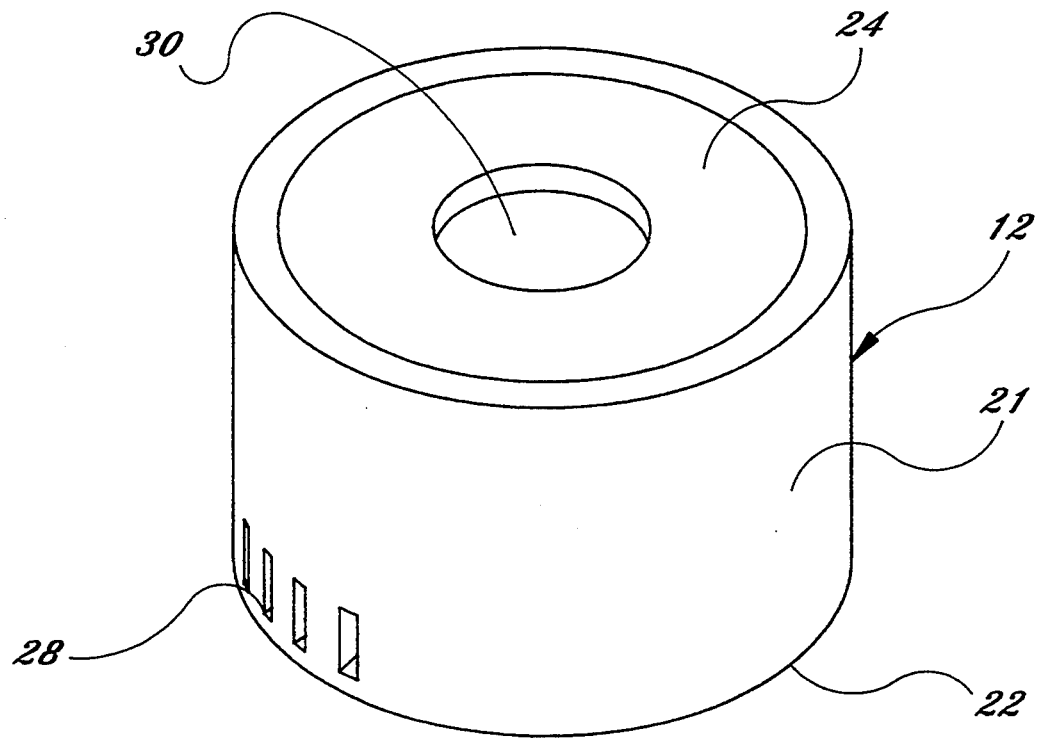
FIG. 6 is a perspective view of the base jacket in an alternative embodiment depicting the heat vents.

In the preferred embodiment, the base jacket 12 is comprised of sidewalls 20, an open bottom end 22 and a top end closure panel 24, as depicted in FIG. 5. The base jacket 12 and container sleeve 14 are substantially cylindrical but may be otherwise and still fall within the scope of the invention. The base jacket 12 and container sleeve 14 are fabricated from flexible material, as aforementioned, so that the appliance muffler is adaptable to various shapes and sizes, and is tight and flush fitting to conserve space and to increase the efficiency of sound absorption by leaving no empty space available for acoustical vibrations to escape. The sidewall 20 is curved and continuous such that it has no defined end and has a vertical height sufficient to contain the appliance base 16. The sidewall 20 may be other than curved and continuous so long as it encloses the base 16, and it will still fall within the scope of the invention. Sidewall 20 defines a control aperture 26 for receiving a switch 27 or control lever to operate the appliance when the jacket 12 is mounted to the appliance. The control aperture 26 may consist of one or more apertures depending on the number of switches incorporated into the appliance design. In an alternative embodiment, the sidewall 20 may provide a slit or a plurality of slits 28 as depicted in FIG. 6, which together provide a heat ventilation system. The open bottom end 22, as seen in FIG. 5, receives the appliance for insertion and has a width sufficient for receiving the appliance such that a snug fit is achieved. The top end closure panel 24 is a substantially planar member which may be integrally formed with, or sealingly attached or securely attached to the sidewall 20 to provide a top end closure for the appliance base 16. The top end closure panel 24 defines a container aperture 30 for receiving a container 18 that normally mounts to the appliance base 16. The container aperture 30 is designed to fit flush against the container 18 to prevent the escape of sound vibrations. A groove or recession 32, as shown in FIG. 5, may be found at the bottom surface of top end closure panel 24 for receiving support brackets 34 typically found protruding from the top of conventional appliance bases. By providing a recession 32 in the bottom surface of closure panel 24, the jacket 12 is capable of completely receiving the appliance base and fitting flush thereto without leaving acoustical voids. A plurality of fasteners 36 may be found along the interior sidewall 21 of sidewall 20 which are strategically aligned in positions that facilitate the fastening of the base jacket 12 to fabric fasteners located on the appliance base 16. In an alternative embodiment, as shown in FIG. 7, fabric fasteners 38 may be secured to a base plate 40 for securing the jacket 12 thereto.

The container sleeve 14 comprises a flexible material, as aforementioned, for insulating the container to protect the same from impact, to absorb sounds emitted from the container, to absorb vibrations in the container caused by the motor and to maintain thermal consistency. The container sleeve 14 is stretchable such that it conforms to the shape of the container, and is constructed from a material similar to that of the base jacket such that it sealingly engages the container aperture 30 upon insertion. The sleeve 14 is typically 7.5 inches in height for blender containers, but may be otherwise and still fall within the scope of the invention.

Figure 4:
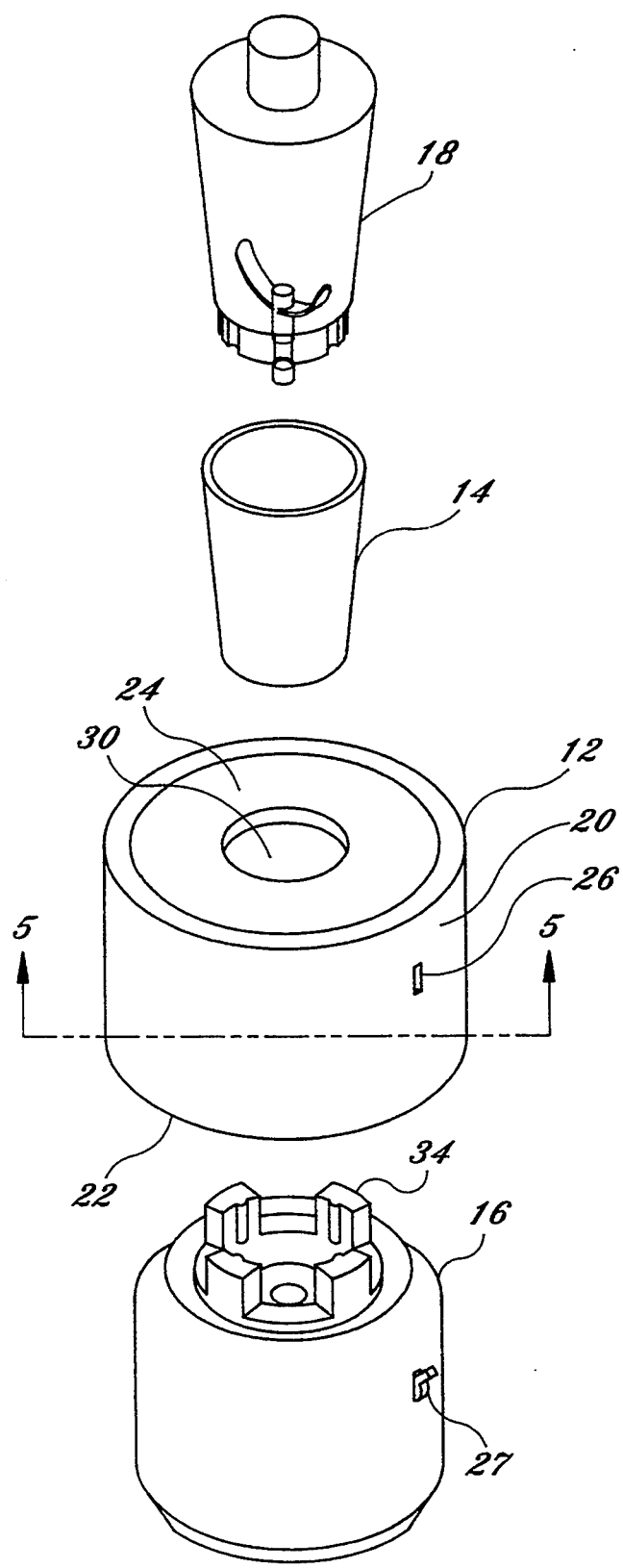
FIG. 4 is an exploded view of the instant invention.

Referring to FIG. 4, to utilize the appliance muffler 10 the open bottom end 22 of the base jacket 12 is mounted over the appliance base 16, while the container sleeve 14 is stretched and fitted over the container 18. The jacket 12 is placed over the blender base 16 so that the support brackets 34 completely engage recession 32. As seen in FIG. 4, the sleeve 14 is smaller in diameter than the appliance container 18, but is stretchable so that a secure fit may be obtained. Subsequently, the container 18 and sleeve 14 configuration is inserted into container aperture 30 and mounted to appliance base 16 which is already insulated by base jacket 12. The base jacket 12 should be positioned such that the control switch or switches are received by the control aperture 26. In an alternative embodiment the fabric fastener patches 36 should be carefully aligned with fabric fasteners 38 located on appliance base 16 to secure the jacket 12 to the appliance base 16.

Figure 7:
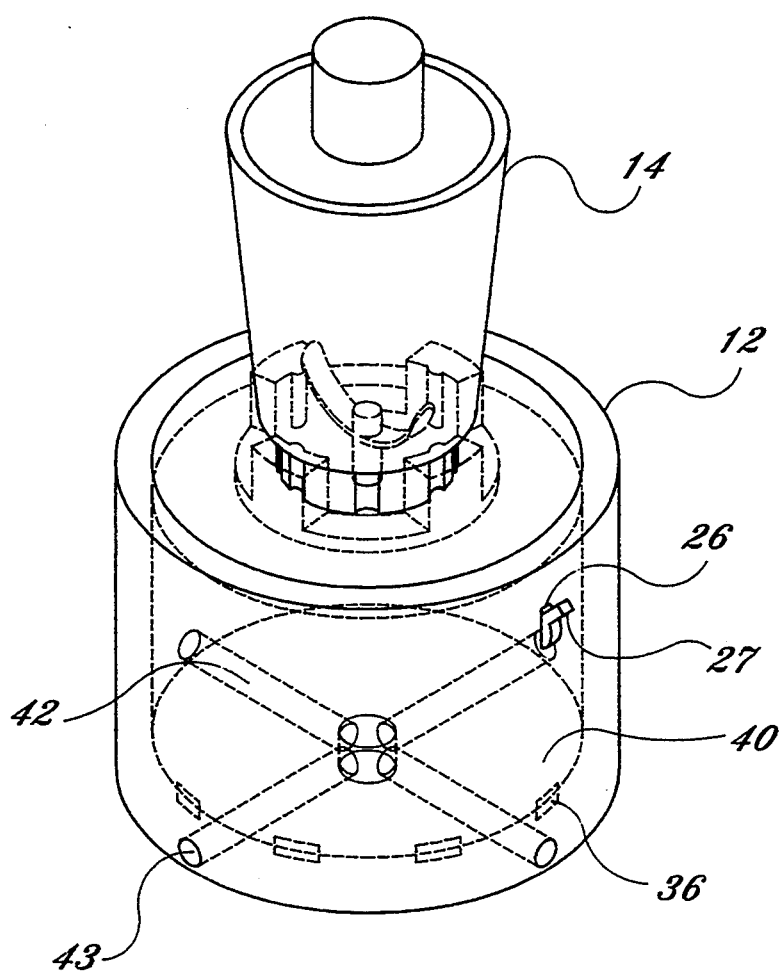
FIG. 7 is a perspective view of the alternative embodiment of the instant invention with the appliance base and base plate shown in fantom.
Figure 8:
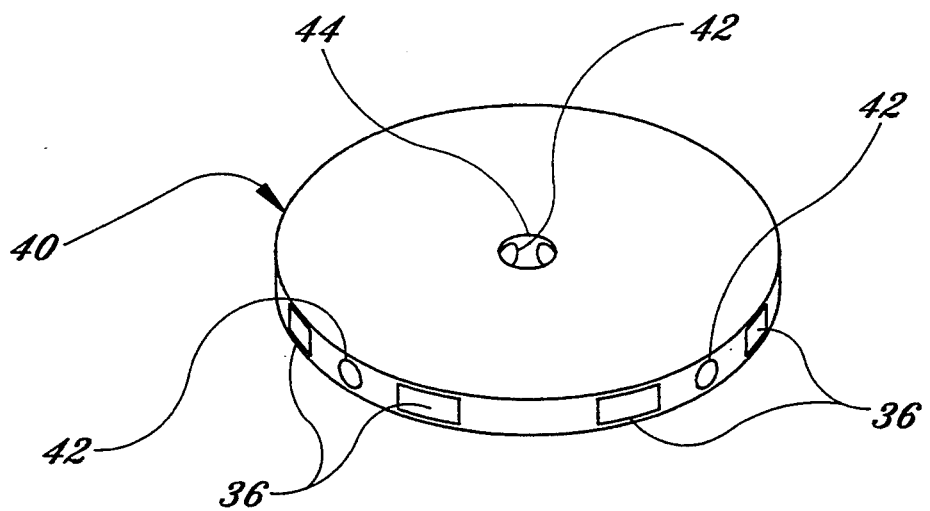
FIG. 8 is a perspective view of the base plate.

FIG. 7 represents an alternative embodiment of the invention, wherein base plate 40, as seen in FIG. 8, is incorporated into the design. Base plate 40 is a rigid planar surface fabricated from wood, plastic, plaster or other rigid material and is utilized to absorb vibrations, to provide appliance support and to effectuate the secured attachment of the base jacket 12. Base plate 40 typically adopts the circumferential shape of the appliance base 16 peripheral edge so that the jacket 12 uniformly fits over the two. In this alternative embodiment, the lower interior surface of the base jacket 12 and the outer peripheral edge of the base plate 40 contain fabric fastening patches, such as velcro, which strategically align to facilitate the fastening of the base jacket 12 to the base plate 40. The base plate 40 may also define grooves or bores 42 to serve as heat ventilating channels. A central bore 44 may be provided at the top surface of the base plate 40 and blended into grooves 42 which extend outwardly and longitudinally towards the outer surface of the base plate 40. In this arrangement, the base jacket 12 provides concentric apertures 43 in strategic alignment with bores 42 to effectuate heat transfer to the ambient. The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An appliance muffler for use with an electrical appliance of the type having an electric motor base, a switch or switches on the base for controlling the appliance and an appliance container which mounts to the appliance base, said appliance muffler comprising:
    a generally flexible enclosure for mounting to the appliance base to protect the appliance base from impact and to absorb sound waves emitted from said appliance, said enclosure having a curved sidewall defining an open bottom end for receiving the appliance base, said sidewall further defining a peripheral top end;
    a closure panel attached to said sidewall along the peripheral top end, said closure panel defining an aperture aligned for receiving the appliance container for mounting to the appliance base;
    a sleeve for mounting over the appliance container, for absorbing sounds emitted from the container, for maintaining thermal properties of the container and for protecting the container from impact;
    said sidewall defining at least one aperture for receiving a switch or switches disposed on the appliance base;
    said enclosure fabricated from a sound and impact absorption material;
    said sleeve fabricated from a sound impact absorption material;
    a fastening means attached to said sidewall and to said appliance base for securing said sidewall to said appliance base.

2. An appliance muffler according to claim 1, wherein said sound and impact absorption material comprises a synthetic rubber.

3. An appliance muffler according to claim 1, wherein said sound and impact absorbing material comprises a polystyrene foam.

4. An appliance muffler according to claim 1 further comprising a means for ventilating heat produced by the appliance base, said means for ventilating heat defined by said sidewall.

5. An appliance muffler according to claim 4, wherein said means for ventilating comprises at least one slit defined by said sidewall.

6. An appliance muffler according to claim 1, further comprising a planar base plate for supporting the appliance base and for absorbing sound wave vibrations produced by the electrical appliance; said base plate having at least one bore for ventilating heat produced by the appliance base; said sidewall including at least one bore aperture in strategic alignment with said base bore.

7. An appliance muffler according to claim 1, further comprising a planar base plate for supporting the appliance base and for absorbing sounds transmitted by the electrical appliance;
    said base plate having dimensions substantially similar to the open bottom end of said enclosure when said enclosure is mounted to the appliance base, said open bottom end of said enclosure circumscribing the base plate;
    said base plate defining at least one bore for ventilating heat provided by said appliance base;
    said sidewall defining at least one bore aperture in strategic alignment with said base bore.

8. An appliance muffler for use with an electrical appliance of the type having an electric motor base, a switch or switches on the base for controlling the appliance and an appliance container which mounts to the appliance base, said appliance muffler comprising:
    a generally flexible enclosure for mounting to the appliance base for absorbing impact and sound waves produced by the appliance, said enclosure having a substantially cylindrical sidewall defining an open bottom end for receiving the appliance base, said sidewall defining a peripheral top end;
    a sleeve for mounting over an appliance container for absorbing impact and sound waves and for maintaining the thermal properties of the container;
    a closure panel sealingly attached to said sidewall along the peripheral top end, said closure panel defining an aperture for receiving the container;
    said enclosure having at least one aperture for receiving a switch or switches disposed on the appliance base;
    said enclosure fabricated from a sound impact absorption material that flexibly adapts to the contours of the appliance;
    said sleeve fabricated from a sound impact absorption material that flexibly adapts to the contours of the container;
    said sound impact absorption material comprising a synthetic rubber;
    a base plate comprising a rigid planar member having dimensions substantially equivalent to the peripheral edge of the appliance base, said base plate supporting the appliance base and absorbing acoustical vibrations produced by the appliance;

a means for fastening said enclosure to said base plate, said fastening means attached to said sidewall and to said base plate in strategically aligned positions for securing said enclosure to the appliance base;

said base plate defining a plurality of bores for ventilating heat; and a plurality of ventilation bore apertures defined by said sidewall in strategically aligned positions with said bores.

* * * * *